United States Patent
Lee

(10) Patent No.: US 8,035,743 B2
(45) Date of Patent: Oct. 11, 2011

(54) METHOD FOR PROCESSING DATA IN A TERMINAL WITH DIGITAL BROADCASTING RECEIVER

(75) Inventor: Young-Sik Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1276 days.

(21) Appl. No.: 11/705,819

(22) Filed: Feb. 13, 2007

(65) Prior Publication Data

US 2007/0200964 A1    Aug. 30, 2007

(30) Foreign Application Priority Data

Feb. 14, 2006   (KR) .................. 10-2006-0014270

(51) Int. Cl.
H04N 5/44   (2006.01)
(52) U.S. Cl. ...................................... 348/553; 348/725
(58) Field of Classification Search .................. 348/553, 348/552, 725–728, 571, 714, 720; 725/135, 725/100, 32–36, 137; H04N 5/44, 7/00, 9/64, H04N 5/455
See application file for complete search history.

(56) References Cited

U.S. PATENT DOCUMENTS

| 6,697,356 | B1 | 2/2004 | Kretschmer et al. |
| 7,639,706 | B2 * | 12/2009 | Hamada et al. ............... 370/428 |
| 2005/0117583 | A1 | 6/2005 | Uchida et al. |
| 2006/0179389 | A1 * | 8/2006 | Lee et al. ..................... 714/746 |
| 2007/0189183 | A1 * | 8/2007 | Kim et al. ..................... 370/252 |

FOREIGN PATENT DOCUMENTS

| KR | 1020030019893 | 3/2003 |
| WO | WO 2004/062291 | 7/2004 |
| WO | WO 2005/122025 | 12/2005 |

* cited by examiner

*Primary Examiner* — Sherrie Hsia
(74) *Attorney, Agent, or Firm* — The Farrell Law Firm, P.C.

(57) ABSTRACT

Disclosed is a method for processing digital broadcasting data in a portable terminal having a digital broadcasting receiver. The method includes, when the digital broadcasting data is received, charging the received digital broadcasting data in a buffer, and outputting the charged digital broadcasting data at a first output speed, when the subsequent digital broadcasting data is received, charging the subsequent digital broadcasting data in the buffer, and checking a capacity of the digital broadcasting data charged in the buffer, and when the capacity of the digital broadcasting data charged in the buffer is less than a threshold capacity, outputting the subsequent received digital broadcasting data at a second output speed slower than the first output speed, and when the capacity of the digital broadcasting data charged in the buffer is greater than the threshold capacity, outputting the subsequent received digital broadcasting data at the first output speed.

11 Claims, 4 Drawing Sheets

METHOD FOR PROCESSING DATA IN A TERMINAL WITH DIGITAL BROADCASTING RECEIVER

PRIORITY

This application claims priority to an application entitled "METHOD FOR PROCESSING DATA IN TERMINAL WITH DIGITAL BROADCASTING RECEIVER" filed in the Korean Industrial Property Office on Feb. 14, 2006 and assigned Serial No. 2006-0014270, the contents of which are incorporated herein by reference.

BACKGROUND OF THE INVENTION

1. Field of the Invention

The present invention relates generally to a supplementary service method for a portable terminal, and in particular, to a method for receiving and processing broadcasting signals.

2. Description of the Related Art

In general, current portable terminals show a tendency to mount a dedicated multimedia processor or strengthen a multimedia function. Research regarding technologies for mounting a television function, and a digital broadcasting receiver function to the portable terminals is ongoing.

In this manner, the portable terminals equipped with the television function, and the digital broadcasting receiver function will make it possible to process data received from each equipment, synchronize audio data and video data, and output the synchronized data.

Currently, standards for digital broadcasting are intensively established all over the world. Digital broadcasting is largely divided into a Digital Multimedia Broadcasting (DMB) scheme in the USA and a Digital Video Broadcasting (DVB) scheme in Europe. The portable terminals having the digital broadcasting receiver function include a tuner, a demodulator, and a decoder, respectively in order to receive the digital broadcasting. Here, the tuner, the demodulator, and the decoder for receiving the digital broadcasting make use of a frequency different from a communication frequency in the portable terminal, as well as demodulating and decoding techniques different from those of the portable terminal.

As for operation of outputting digital broadcasting data in a conventional portable terminal having the digital broadcasting receiver function, when a digital broadcasting channel is first selected, the Radio Frequency (RF) tuner down-converts the frequency of a broadcasting signal of the selected channel to produce an intermediate frequency (IF) signal. The demodulator demodulates a modulated digital broadcasting signal into an original signal. The decoder separates the broadcasting signal demodulated by the demodulator into audio and video signals, as well as decodes and outputs the separated audio and video signals.

As for a more detailed description of the processing operation of the decoder, the decoder receives a Transport Stream (TS) packet from the digital broadcasting signal, demultiplexes the TS packet, and separates the demultiplexed TS packet into audio and video data. The audio data together with the video data are charged in an audio buffer and a video buffer, respectively. At this time, because no data is first charged in the buffers, the buffers are on standby until the data is charged up to a set threshold or more in the buffers. Thereafter, when the data is charged up to the set threshold or more in the buffers, the data is output.

In the conventional portable terminal, a predetermined time is required until the data is charged up to the set threshold or more in the buffers. This time functions as a delay time that it takes to first output the audio and video data after a user selects a specific channel. Further, when the threshold is great, an initial regeneration time of the audio and video data becomes long. In contrast, when the threshold is small, the initial regeneration time becomes short, but a capacity of the data charged in the buffers is not sufficient. In other words, an underflow takes place, thereby causing a sleep state to be entered.

SUMMARY OF THE INVENTION

Accordingly, the present invention has been made to solve the above-mentioned problems occurring in the conventional art, and an objective of the present invention is to provide a method for processing digital broadcasting data by reducing an initial buffering time to the minimum extent when the digital broadcasting data is regenerated in a portable terminal having a digital broadcasting receiver.

According to an aspect of the present invention, there is provided a method for processing digital broadcasting data in a portable terminal having a digital broadcasting receiver. The method includes when the digital broadcasting data is received, charging the received digital broadcasting data in a buffer, and outputting the charged digital broadcasting data at a first output speed; when the subsequent digital broadcasting data is received, charging the subsequent digital broadcasting data in the buffer, and checking a capacity of the digital broadcasting data charged in the buffer; and when the capacity of the digital broadcasting data charged in the buffer is less than a threshold capacity, outputting the subsequent received digital broadcasting data at a second output speed slower than the first output speed, and when the capacity of the digital broadcasting data charged in the buffer is greater than the threshold capacity, outputting the subsequent received digital broadcasting data at the first output speed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
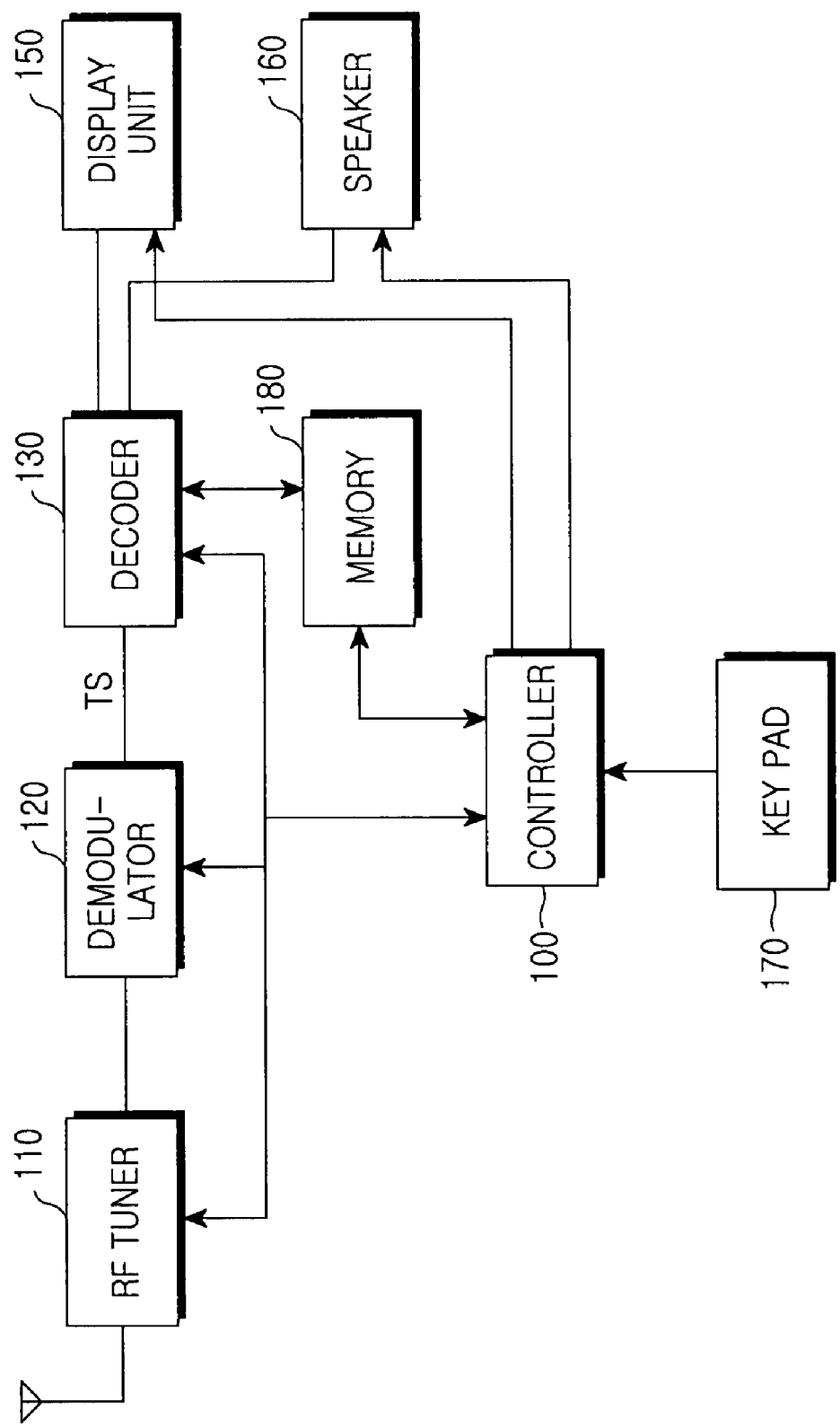
FIG. 1 is a block diagram illustrating a construction of a portable terminal having a digital broadcasting receiver in accordance with the present invention.

FIG. 1 is a block diagram illustrating a construction of a portable terminal having a digital broadcasting receiver in accordance with the present invention. In FIG. 1, the portable terminal includes a Radio Frequency (RF) tuner 110, a demodulator 120, and a decoder 130 of the digital broadcasting receiver. Here, the decoder 130 can be mounted on a controller 100. In this case, it is possible to embody performance of the decoder of the digital broadcasting receiver using software. Further, the portable terminal can additionally include a RF unit and a modem for wireless communication, and a camera, a signal processor, and a image processor that are capable of obtaining an image. In the following description, the additional components will be omitted so as not to make the subject matter of the present invention unclear.

Referring to FIG. 1, a keypad 170 is provided with keys for inputting information such as figures and text, and functional keys for setting various functions. Additionally, the functional keys include keys for selecting a channel for receiving digital broadcasting in accordance with the present invention, and for selecting a function, for instance, of controlling a broadcasting reception mode.

A memory 180 can be configured of at least one program memory, and at least one data memory. The program memory stores programs for receiving broadcasting of the digital broadcasting receiver, and programs according to f the present invention. Further, the data memory can be used as an image memory for storing image data of the digital broadcasting receiver, which is received under the control of the controller 100. Here, when the controller 100, as a controller of the portable terminal, has another memory for executing the program, the memory 180 may be the image memory.

The RF tuner 110 selects a digital broadcasting channel by means of channel control data of the controller 100, and down-converts the frequency of a broadcasting signal of the selected channel to produce an Intermediate Frequency (IF) signal.

The demodulator 120 serves to demodulate a modulated digital broadcasting signal into an original signal. The decoder 130 separates the broadcasting signal demodulated by the demodulator into video and audio signals, as well as decodes and outputs the separated video and audio signals. Further, the decoder 130 includes a demultiplexer, an input buffer, an audio decoder, a video decoder, a synchronization processor, an audio buffer, and video buffer. Thereby, when the digital broadcasting data is regenerated according to the present invention, the decoder 130 can minimize an initial buffering time to perform the operation of processing the digital broadcasting data.

The controller 100 controls the portable terminal. Particularly, the controller 100 produces control data for selecting the channel of the digital broadcasting receiver via the keypad 170 inputting keys, for controlling the demodulator and the decoder, and for determining decoding performance of the decoder. Further, when the digital broadcasting data is received according to the present invention, the controller 100 controls the received digital broadcasting data in order to be charged in the buffers, outputs the charged digital broadcasting data at a first output speed, and changes as well as sets the first output speed into a second output speed. Thereafter, when the next digital broadcasting data is received, the controller 100 controls the next digital broadcasting data so as to be charged in the buffers, and checks a capacity of the digital broadcasting data charged in the buffers. As a result, when the capacity of the digital broadcasting data charged in the buffers is less than a threshold value, the controller 100 controls the received next digital broadcasting data so as to be output at the second output speed. In contrast, when the capacity of the digital broadcasting data charged in the buffers is greater than a threshold value, the controller 100 changes the output speed into the first output speed, and then controls the received next digital broadcasting data so as to be output at the first output speed.

A display unit 150 displays the video signal of the digital broadcasting receiver which is processed by the decoder 130 under the control of the controller 100. A speaker 160 serves to regenerate the audio signal processed by the decoder 130 under the control of the controller 100.

An operation of processing the broadcasting data in the portable terminal will be described below with reference to FIG. 1. The received broadcasting signal can be at least one of the signal of a Very High Frequency (VHF) band (174 MHz through 230 MHz: C5 through C12), the signal of an Ultra High Frequency (UHF) band (470 MHz through 862 MHz: C21 through C69), and the signal of an L band (1 GHz through 2.6 GHz). At this time, when the user selects a broadcasting channel, the controller 100 outputs control data corresponding to a channel selected by the RF tuner 110. Then, the RF tuner 110 produces and mixes an RF based on the channel control data, thereby generating an IF signal of the selected channel. Here, the IF can be 36.17 MHz. Further, according to the present invention, supported audio sampling frequencies are 48 KHz, 44.1 KHz, and 24 KHz.

The analog IF signal as mentioned above is applied to the demodulator 120. Then, the demodulator 120 performs analog-to-digital conversion on the received analog signal, and then demodulates and outputs the converted digital signal in a preset demodulating mode. Here, the modulation mode of the digital broadcasting receiver can make use of a Coded Orthogonal Frequency Division Multiplexing (COFDM) mode. According to the present invention, the demodulator 120 can use a model MT352, which is available from the Zarlink Company. In this case, the signal demodulated by the demodulator 120 is output as 8-bit Moving Picture Experts Group (MPEG)-2 TS data. Simply, the demodulator 120 allows the signal of the selected channel output by the RF tuner 110 to be converted into digital data, to be controlled based on the number of carriers, an additional symbol, etc., and to loop a Fast Fourier Transform (FFT) circuit. The FFT signal is reconstructed in sequence and interval in order to be regenerated to a final signal through error correction, and is output as the final signal, MPEG-2 TS signal.

The MPEG-2 TS signal output by the demodulator 120 is applied to the decoder 130. Then, the decoder 130 separates each of the received MPEG-2 TS signals into image, audio, and data, decodes the separated results, and outputs the decoded results as video data and audio data. At this time, the video data can be RGB data or YUV signals, and the audio data is generally output in a Pulse Code Modulation (PCM) stereo sound type. The video data output by the decoder 130 is output and displayed to and on the display unit 150, and the audio data is applied and regenerated to and by the speaker 160.

At this time, the controller 100 controls overall operation of the digital broadcasting receiver. To this end, the controller 100 outputs the channel control data, which is used for determining a frequency domain of the channel selected by the user, to the RF tuner 110 and other control data such as a carrier mode (e.g. 2k, 8k etc.). The demodulator 120 is so set that demodulation operation can be normally performed by designating a code rate that is information varied according to a broadcasting standard of each country, a guard interval, and so on. Further, the decoder 130 performs an initialization work to designate a service actually watched through a determined physical channel, a frame rate, a display size, and so on, and simultaneously performs commands such as playback, stop, recording, screen capture, and so on. Additionally, the decoder 130 receives feedback information depending on the decoding process.

In order to perform the decoding process, the decoder 130 requires a decoding memory, which can be used as input and output buffers for the digital broadcasting signal, a storage space for other setup, and a provisional buffer on decoding. At this time, the decoding memory can be shared by the controller 100 and the decoder 130. Further, the decoding memory stores decoded information in a table, in addition to being used as the input and output buffers of the video and audio signals. The data capable of being stored in the table includes various pieces of information, such as a picture sequence, and a Group Of Picture (GOP) sequence (e.g. IBBPBBP), used as a determination criterion in the decoding process among header information of each frame.

A construction of the decoder 130 in the portable terminal having the digital broadcasting receiver constructed as mentioned above will be described in detail.

Figure 2:
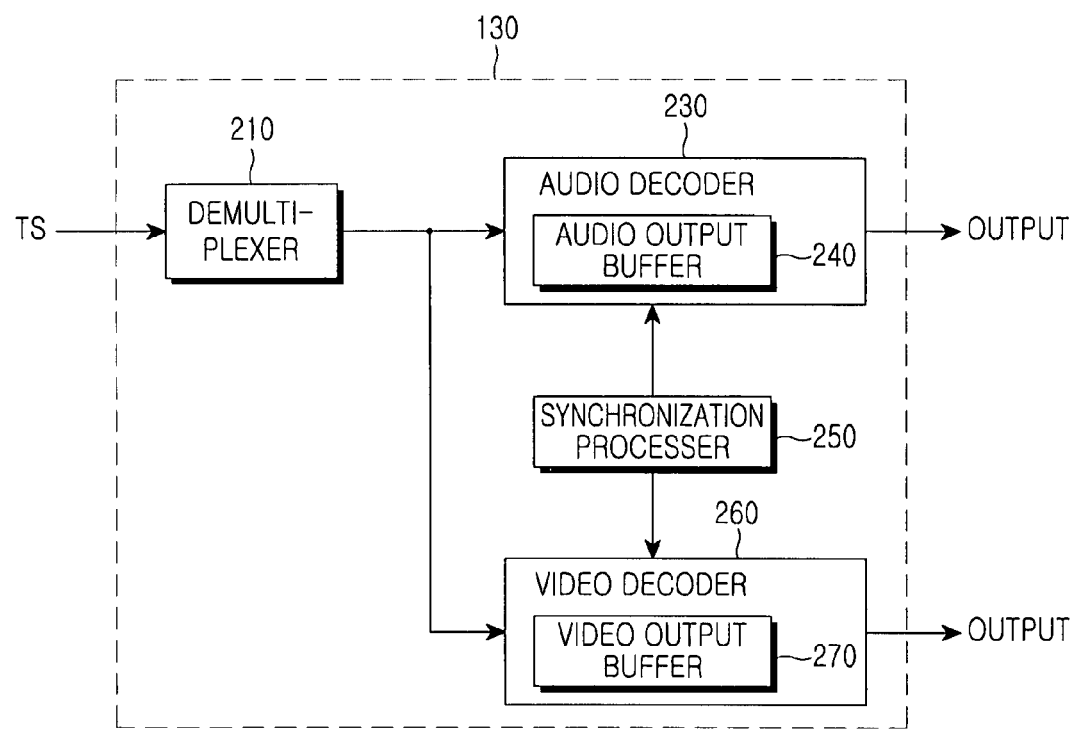
FIG. 2 is a block diagram illustrating a construction of the decoder of FIG. 1.

FIG. 2 is a block diagram illustrating a construction of the decoder 130. Referring to FIG. 2, a demultiplexer 210 receives the demodulated MPEG-2 TS data output by the demodulator 120, and splits each data into audio, video, and other data. Here, the other data refer to data excluding the video and audio included in the digital broadcasting signal, and include program data, and so on. Hereinafter, the description of the other data will be omitted. Accordingly, in the following description, the broadcasting signal will be limited to video and audio signals. At this time, the controller 100 selects broadcasting information to be selected by the demultiplexer 210, i.e. service (Product Identifier (PID)), and notifies the selected PID to the demultiplexer 210. Thus, the demultiplexer 210 selects target data from various data output by the demodulator 120 based on the selected PID, and then splits the selected data into both video and audio.

An audio decoder 230 decodes the audio signal. At this time, in the broadcasting of the digital broadcasting receiver, MPEG-2 audio Elementary Stream (ES) is received and converted into a Pulse-Code Modulated (PCM) audio signal. The converted PCM audio signal is charged in an audio output buffer 240, and then is output at an output time. When supported audio sampling frequencies are 48 KHz, 44.1 KHz, and 24 KHz, a size of decoded audio data (frame) is 1024 bytes.

A video decoder 260 decodes the video data. At this time, in the broadcasting of the digital broadcasting receiver, MPEG-2 video ES is generally received and converted into YUV 4:2:0 data. However, it is converted into RGB video data, because it should be output to be compatible with the display unit (Liquid Crystal Display (LCD)) of the portable terminal. The video signal is selectively decoded according to a size of the display unit of the portable terminal. The converted RGB video data is charged in a video output buffer 270, and then is output at an output time. Here, according to the present invention, the video data (frame) is output at a rate of 33 frames per second.

A synchronization processor 250 is used to output the audio and video data at the output time. According to the present invention, the synchronization processor 250 controls the audio decoder 230 and the video decoder 260 so as to output the audio and video data either at an ordinary output speed, a first output speed, or at a second output speed slower than the first output speed.

Figure 3A:
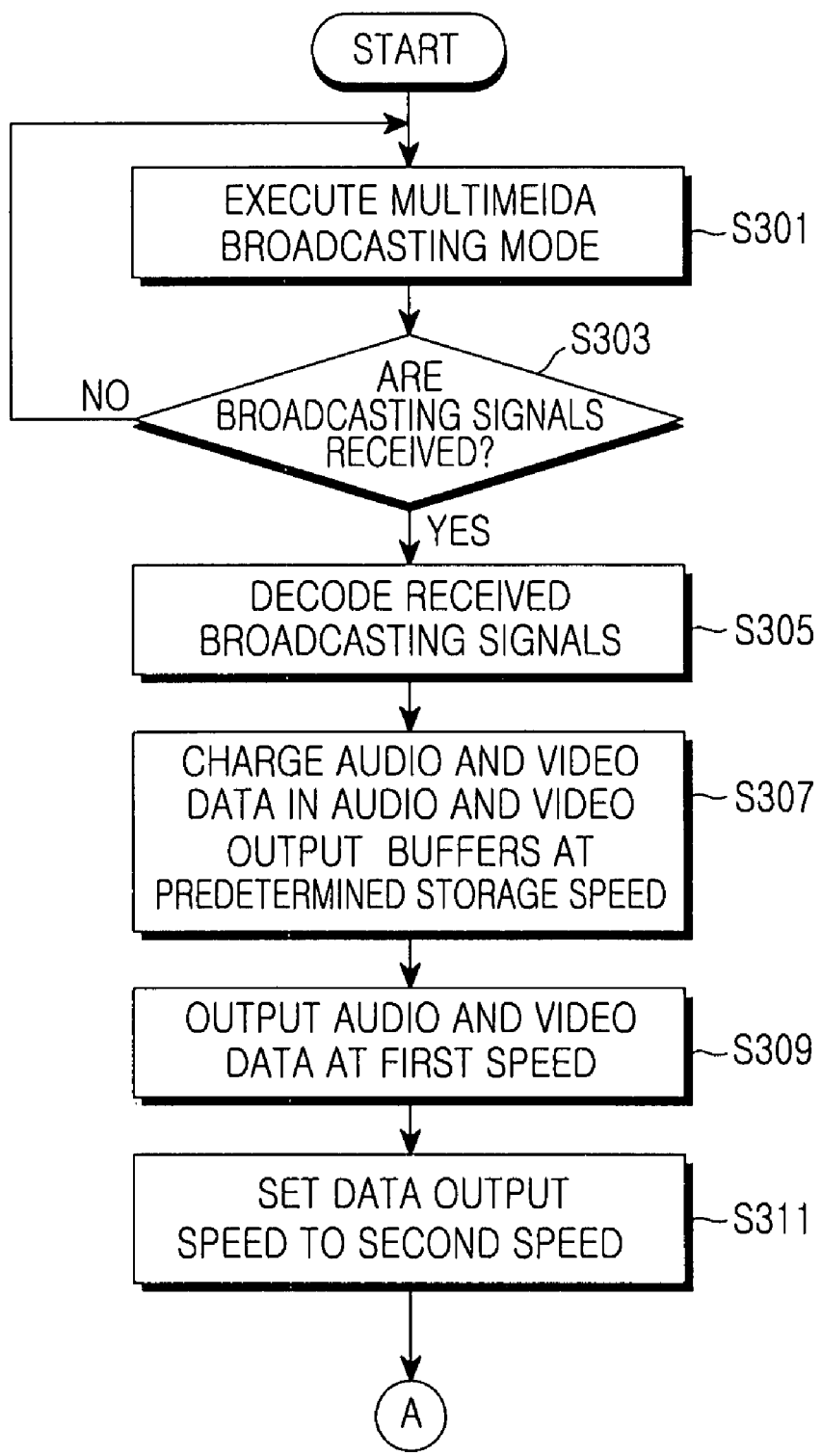
FIGS. 3A and 3B are flowcharts illustrating processing data in a digital broadcasting receiver according to the present invention.
Figure 3B:
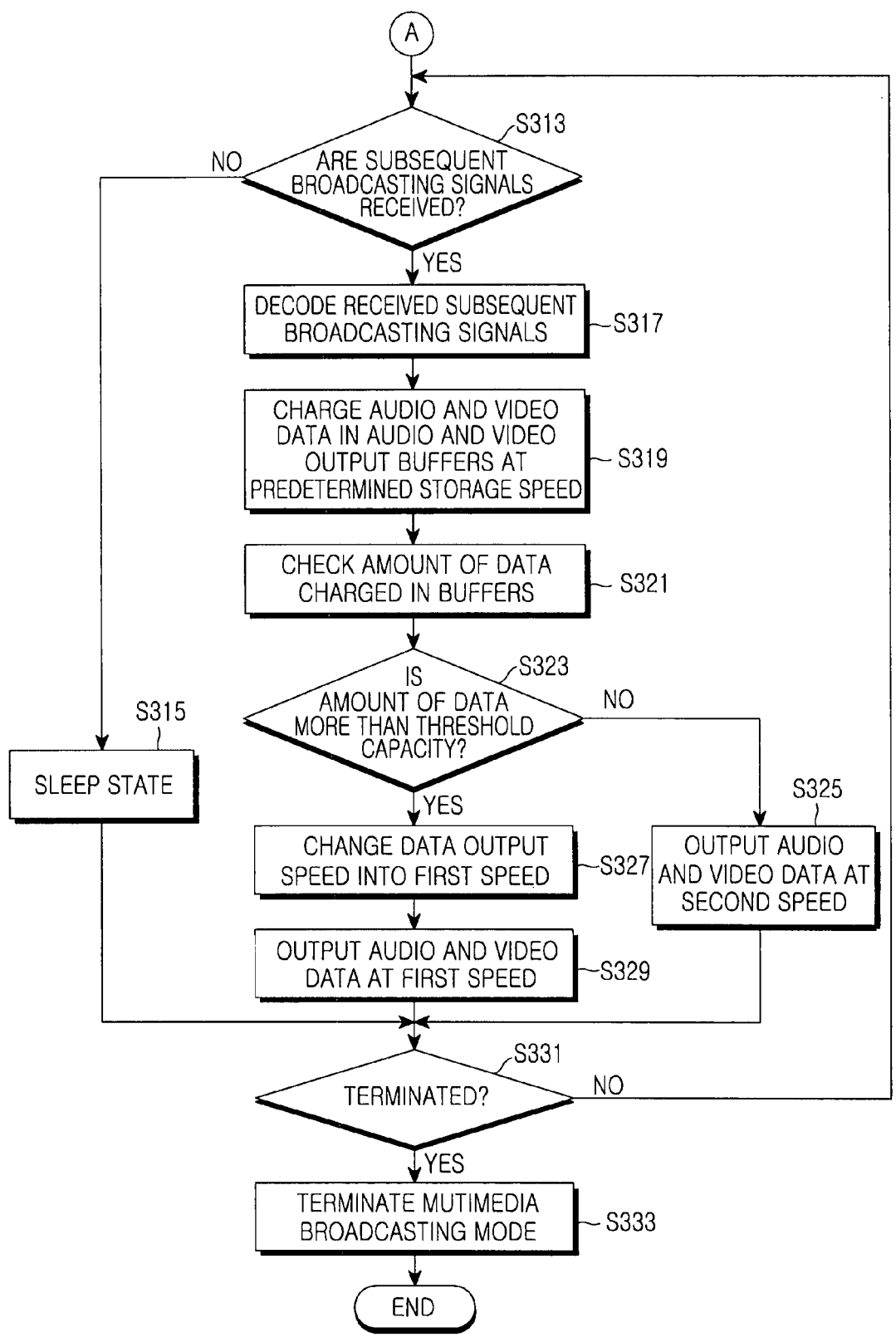

FIGS. 3A and 3B are flowcharts illustrating processing data in a digital broadcasting receiver according to the present invention. When digital broadcasting data is regenerated in the portable terminal having the digital broadcasting receiver, the digital broadcasting data is processed with a initial buffering time reduced to a minimum. This digital broadcasting data processing operation will be described with reference to FIGS. 3A and 3B. A user executes a multimedia broadcasting mode in which a request to output digital broadcasting is made using a digital broadcasting output request key or a digital broadcasting regeneration key that is provided to the key pad 170. In step S301 of executing the multimedia broadcasting mode, when the corresponding digital broadcasting signals (audio and video signals) are received through the RF tuner 110, this is detected in step S303 by the controller 100, and it proceeds to step S305. Here, the received digital broadcasting signals (audio and video signals) are first received in the multimedia broadcasting mode.

In step S305, the controller 100 controls the demodulator 120, the demultiplexer 210, the audio decoder 230, and the video decoder 260, and then decodes the received digital broadcasting signals (audio and video signals). Here, for the decoding, the received digital broadcasting signals are demodulated into original signals, i.e. 8-bit MPEG TS data, through the demodulator 120, and then audio and video PIDs are looked up in a header of the MPEG TS data, i.e. the demodulated broadcasting signals, and divided into audio and video data at the demultiplexer 210. As a result of the division, the audio data is transmitted to the audio decoder 230, and the video data is transmitted to the video decoder 260. The audio decoder 230 converts the audio data into PCM audio data, and the video decoder 260 converts the video data into RGB video data.

Then, in step S307, the controller 100 controls the audio output buffer 240 and the video output buffer 270, and charges the decoded audio data (i.e. the PCM audio data) and the decoded video data (i.e. the RGB video data) in the audio output buffer 240 and the video output buffer 270 at a predetermined storage speed, respectively. Here, the predetermined storage speed of the audio data is the same as an ordinary output speed according to the audio sampling frequency. For example, assuming that the decoded audio data has a size of 1024 bytes, when the audio sampling frequency is 48 KHz, the output speed is 21.33 msec (1024 bytes/48 KHz), and thus the storage speed averages 21.33 msec. Further, when the audio sampling frequency is 44.1 KHz, the output speed is 23.22 msec (1024 bytes/44.1 KHz), and thus the storage speed averages 23.22 msec. Meanwhile, the predetermined storage speed of the video data is a predetermined speed of 30 frame/sec.

In step S309, the controller 100 controls the audio output buffer 240, the video output buffer 270, and the synchronization processor 250, and outputs both the audio data charged in the audio output buffer 240 and the video data charged in the video output buffer 270 at a first output speed. Here, the first output speed refers to a speed at which the audio and video data are generally output. The first output speed, the speed at which the audio data is generally output, is varied according to the audio sampling frequency. For example, assuming that the decoded audio data has a size of 1024 bytes, when the audio sampling frequency is 48 KHz, the first output speed is 21.33 msec (1024 bytes/48 KHz). Further, when the audio sampling frequency is 44.1 KHz, the first output speed is 23.22 msec (1024 bytes/44.1 KHz). Meanwhile, the first output speed, the speed at which the video data is generally output, is a predetermined speed of 30 frame/sec.

After the audio and video data received first in the multimedia broadcasting mode are output at the first output speed, the controller 100 controls the synchronization processor 250 in step S311, changes the first output speed to a second output speed, and sets the changed result. Here, the first output speed is the speed at which the audio and video data are generally output, and the second output speed is slower than the first output speed. In the output speed of the audio data, when the ordinary output speed (i.e. the first output speed) is 21.33 msec (1024 bytes/48 KHz) corresponding to the audio sampling frequency of 48 KHz, the audio sampling frequency is changed from 48 KHz to 44.1 KHz, and then a speed of 23.22 msec (1024 bytes/44.1 KHz) corresponding to the audio sampling frequency of 44.1 KHz is set to the output speed (i.e. the second output speed). When the ordinary output speed (i.e. the first output speed) is 23.22 msec (1024 bytes/44.1 KHz) corresponding to the audio sampling frequency of 44.1 KHz, the audio sampling frequency is changed from 44.1 KHz to 24 KHz, and then a speed of 42.67 msec (1024 bytes/24 KHz) corresponding to the audio sampling frequency of 24 KHz is set to the output speed (i.e. the second output speed). In the output speed of the video data, the video data should be synchronized with the audio data, and thus it is changed and set according to the output speed of the audio data. If the audio sampling frequency is changed from 48 KHz to 44.1 KHz, the second output speed of the video data is set to 35.92 msec ((33 msec×23.22 msec)/21.33 msec). Further, if the audio sampling frequency is changed from 44.1 KHz to 24 KHz, the second output speed of the video data is set to 60.64 msec ((33 msec×42.67 msec)/23.22 msec).

In the above-described embodiment, when digital broadcasting data is received after the audio and video data received first in the multimedia broadcasting mode are output at the first output speed, the first output speed is changed the second output speed, and then the changed second output speed is set. However, when the audio and video data are received for the first time, the first output speed may be changed into the second output speed, and then the changed second output speed may be set.

When the subsequent digital broadcasting signals (audio and video signals) are not received through the RF tuner 110, the controller 100 controls it to proceed to step S315, a digital broadcasting data reception sleep state. In contrast, when the subsequent digital broadcasting signals (audio and video signals) are not received through the RF tuner 110, this is detected in step 313 by the controller 100, and then the process proceeds to step S317. Here, the subsequent received digital broadcasting signals (audio and video signals) can be signals received after the initially received digital broadcasting signals in the multimedia broadcasting mode.

In step S317, the controller 100 controls the demodulator 120, the demultiplexer 210, the audio decoder 230, and the video decoder 260, and then decodes the subsequent received digital broadcasting signals (audio and video signals). Here, for decoding, the subsequent received digital broadcasting signals are demodulated into original signals, i.e. 8-bit MPEG TS data, through the demodulator 120, and then audio and video PIDs are looked up in a header of the MPEG TS data, i.e. the demodulated broadcasting signals, and divided into audio and video data at the demultiplexer 210. As a result of the division, the audio data is transmitted to the audio decoder 230, and the video data is transmitted to the video decoder 260. The audio decoder 230 converts the audio data into PCM audio data, and the video decoder 260 converts the video data into RGB video data.

Then, in step S319, the controller 100 controls the audio output buffer 240 and the video output buffer 270, charges the decoded audio data (i.e. the PCM audio data) in the audio output buffer 240 at a predetermined storage speed (e.g. 21.33 msec or 23.22 msec), and charges the video data (i.e. the RGB video data) in the video output buffer 270 at a predetermined storage speed (30 frame/sec).

In step S321, the controller 100 checks amounts of the audio data and the video data charged in the audio output buffer 240 and the video output buffer 270 respectively.

Thereafter, in step S323, the amount of the charged audio or video data are compared with a set threshold capacity. As a result of the comparison, when the amount of the charged audio or video data is less than a set threshold capacity, the controller 100 controls it to proceed to step S325. In step S325, the controller 100 controls the audio output buffer 240, the video output buffer 270, and the synchronization processor 250, and outputs both the audio data charged in the audio output buffer 240 and the video data charged in the video output buffer 270 at the changed, set second output speed. As set forth above, if the second output speed of the audio data is 23.22 msec (1024 bytes/44.1 KHz) corresponding to the audio sampling frequency of 44.1 KHz, the second output speed of the video data is 35.92 msec ((33 msec×23.22 msec)/21.33 msec). Further, if the second output speed of the audio data is 42.67 msec (1024 bytes/24 KHz) corresponding to the audio sampling frequency of 24 KHz, the second output speed of the video data is 60.64 msec ((33 msec×42.67 msec)/23.22 msec).

As a result of the comparison, when the amount of the charged audio or video data is more than a set threshold capacity, the controller 100 controls it to proceed to step S327. In step S327, the controller 100 controls the synchronization processor 250, changes the changed output speed, set second output speed into a first output speed, and sets the changed first output speed. Here, the operation of changing the changed, set second output speed into a first output speed is reverse to the operation of changing the first output speed into the second output speed in step S311. The first output speed refers to a speed at which the audio and video data are generally output, and the second output speed refers to a speed slower than the first output speed. In the output speed of the audio data, when the second output speed is 42.67 msec (1024 bytes/24 KHz) corresponding to the audio sampling frequency of 24 KHz, a speed of 23.22 msec (1024 bytes/44.1 KHz) corresponding to the audio sampling frequency of 44.1 KHz is set to the first output speed. When the second output speed is 23.22 msec (1024 bytes/44.1 KHz) corresponding to the audio sampling frequency of 44.1 KHz, a speed of 21.33 msec (1024 bytes/48 KHz) corresponding to the audio sampling frequency of 48 KHz is set to the first output speed. In the output speed of the video data, the first output speed is set to 30 frame/sec, the speed at which the video data is generally output.

In step S329, the controller 100 controls the audio output buffer 240, the video output buffer 270, and the synchronization processor 250, and outputs both the audio data charged in the audio output buffer 240 and the video data charged in the video output buffer 270 at the first output speed.

Thereafter, when the user pushes an end key for the multimedia broadcasting mode using the key pad 170, the controller 100 controls it to proceed to step 333, and terminates the multimedia broadcasting mode. However, when the end key is not pushed, it proceeds to step S313, and the steps are repeated.

As can be seen from the foregoing, the present invention can reduce the initial buffering time for outputting the first multimedia broadcasting data to the minimum extent when the digital broadcasting data is regenerated, and furthermore it can stably output the digital broadcasting data even when the initial buffering time is reduced to the minimum extent. Further, the present invention can output the digital broadcasting data during buffering, so that it can shorten a time for which the user has to wait while the digital broadcasting data is not output.

Especially, according to the present invention, the initially received digital broadcasting data is output at the first output speed. However, according to the setting, the second or third received digital broadcasting data may be output at the first output speed, and then the first output speed may be changed into the second output speed, and the changed second output speed may be set.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for processing digital broadcasting data in a portable terminal having a digital broadcasting receiver, the method comprising the steps of:
   when the digital broadcasting data is received, charging the received digital broadcasting data in a buffer, and outputting the charged digital broadcasting data at a first output speed;
   when the subsequent digital broadcasting data is received, charging the subsequent digital broadcasting data in the buffer, and checking a capacity of the digital broadcasting data charged in the buffer; and
   when the capacity of the digital broadcasting data charged in the buffer is less than a threshold capacity, outputting the subsequent received digital broadcasting data at a second output speed slower than the first output speed, and when the capacity of the digital broadcasting data charged in the buffer is greater than the threshold capacity, outputting the subsequent received digital broadcasting data at the first output speed.

2. The method according to claim 1, further comprising the step of, after the received digital broadcasting data is output at the first output speed, changing the first output speed to the second output speed, and setting the changed second output speed.

3. The method according to claim 2, wherein the step of changing the first output speed to the second output speed, and setting the changed second output speed further comprises:
   changing an audio sampling frequency of the received digital broadcasting data into a low audio sampling frequency; and
   setting an output speed corresponding to the changed low audio sampling frequency to the second output speed.

4. The method according to claim 3, wherein the audio sampling frequency includes any one of 48 KHz, 44.1 KHz, and 24 KHz.

5. The method according to claim 1, wherein, when the capacity of the digital broadcasting data charged in the buffer is greater than the threshold capacity, changing the output speed from the second output speed to the first output speed, and resetting the changed first output speed.

6. The method according to claim 1, wherein the first output speed is a speed at which the digital broadcasting data is output.

7. A method for processing digital broadcasting data in a portable terminal having a digital broadcasting receiver, the method comprising the steps of:
   when the digital broadcasting data is received, charging the received digital broadcasting data in a buffer with the received digital broadcasting data divided into audio data and video data, and outputting the charged audio and video data;
   when subsequent digital broadcasting data is received, charging the subsequent digital broadcasting data in the buffer with the subsequent digital broadcasting data divided into subsequent audio data and subsequent video data, and checking a capacity of each of the subsequent audio data and the subsequent video data charged in the buffer; and
   when the capacity of each of the subsequent audio data and the subsequent video data charged in the buffer is less than a threshold capacity, outputting the charged subsequent audio and the charged subsequent video data charged in the buffer at a second output speed, and when the capacity of each of the subsequent audio data and the subsequent video data is greater than the threshold capacity, outputting the charged subsequent audio and the charged subsequent video data at a first output speed faster than the second output speed.

8. The method according to claim 7, further comprising, after the audio data and the video data are charged in the buffer, changing an output speed from the first output speed to the second output speed, and setting the changed second output speed.

9. The method according to claim 8, wherein changing an output speed from the first output speed to the second output speed, and setting the changed second output speed further comprises:
   changing an audio sampling frequency of the audio data into a low audio sampling frequency;
   setting an output speed corresponding to the changed low audio sampling frequency to the second output speed; and
   changing an output speed of the video data so as to be synchronized with the second output speed of the audio data, and setting the changed output speed.

10. The method according to claim 9, wherein the audio sampling frequency includes any one of 48 KHz, 44.1 KHz, and 24 KHz.

11. The method according to claim 7, wherein the first output speed is a speed at which the digital broadcasting data is generally output.

* * * * *